INVENTORS.
SPEROS P. NEMPHOS,
MICHAEL B. JASTRZEBSKI

United States Patent Office 3,475,514
Patented Oct. 28, 1969

3,475,514
PROCESS FOR PRODUCING GRAFT COPOLYMER COMPOSITIONS CONTAINING A VARYING RANGE OF GRAFT RATIOS
Speros P. Nemphos, Springfield, and Michael B. Jastrzebski, Ware, Mass., assignors to Monsanto Company, St. Louis, Mo., a corporation of Delaware
Filed Sept. 21, 1966, Ser. No. 581,007
Int. Cl. C08f 1/13, 37/18
U.S. Cl. 260—876  18 Claims

ABSTRACT OF THE DISCLOSURE

A rubbery polymer and a vinylidene monomer formulation are dispersed in an inert non-solvent and are subjected to polymerization conditions while proceeding along a flow path. The exposure of portions of the rubbery polymer to polymerization conditions is controlled to produce varying degrees of grafting. A product stream containing a graft copolymer dispersed in the non-solvent is substantially continuously withdrawn from the flow path to provide a polymerization product having varying graft ratios.

---

Figure 1:
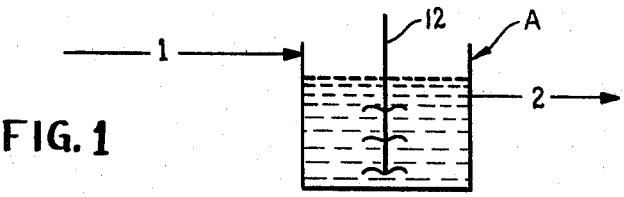

The present invention relates to novel polymeric compositions and, more particularly, to a novel process for producing grafts of a polymeric superstrate on a rubbery substrate.

As is well known, polymeric compositions containing rubber particles dispersed therein provide certain advantages in physical properties. Although physical blends of rubber in the matrix have been utilized, preferably the rubber particles are graft copolymers wherein a polymeric chain is grafted onto a preformed rubber substrate so as to modify the nature and the properties thereof. Such rubber grafts are particularly advantageous in achieving improved adhesion or compatibility of the rubber particles in most matrices.

It has been observed that the degree of grafting upon a given rubbery substrate affects the properties of the graft copolymer per se and consequently of resinous compositions containing it. The term "degree of grafting" generally contemplates both the degree to which sites available on the rubbery substrate for grafting have been utilized for that purpose and the length of the polymeric chains grafted to the rubbery substrate, or the total amount of grafting upon a rubber. As used hereinafter, the term "graft ratio" will be the weight ratio of superstrate to substrate in the graft copolymer.

Recently, it has been found that polyblends containing both a graft copolymer component with a relatively high graft ratio and a graft copolymer component with a relatively low graft ratio exhibit a highly desirable balance of properties. Assuming a uniform particle size, it is believed that the high graft component provides desirable gloss and appearance while the low graft component provides a high degree of impact strength. To achieve this variation in graft ratio, two separate graft polymerization processes have been employed and their products have been blended.

It is an object of the present invention to provide a novel process for producing graft copolymers having a relatively wide spectrum of graft ratios which is relatively economical and facile.

It is also an object to provide such a process which is substantially continuous in operation and which is readily adaptable to variation although comparatively simple and economical.

Another object is to provide a novel graft copolymer having a relatively wide spectrum of graft ratios.

A further object is to provide novel resinous compositions containing graft copolymers having a relatively wide spectrum of graft ratios.

Other objects and advantages will be readily apparent from the following detailed specification and claims and the attached drawing wherein FIGURES 1–5 diagrammatically illustrate processes embodying the present invention.

It has now been found that the foregoing and related objects can be readily attained in a process wherein a rubbery polymer and a polymerizable formulation graftable upon the rubbery polymer are admixed in an inert non-solvent therefor, the resulting mixture being agitated to form a dispersion of the reactants in the non-solvent which can be an emulsion or a suspension dependent upon the size of the dispersed phase. This dispersion is then subjected to polymerization conditions along a flow path while the conditions of polymerization are controlled to produce varying degrees of grafting of the polymerizable formulation upon increments of the rubbery polymer. By substantially continuously adding one or both reactants and continuously extracting a product stream from the flow path, while varying the polymerization conditions to which various portions of the reactants are subjected, it is apparent that a product will be obtained wherein the graft ratio is consistent but increments of the graft copolymer vary within a range of values. Normally the graft ratios will fall within the range of 1:10 to 3:1.

The polymerization conditions may be controlled in a number of ways so as to obtain the desired spectrum of graft ratios in the polymer product. For example, the flow path or reactor may be elongated and portions of the dispersion may be withdrawn at a plurality of points along the flow path after at least partial reaction of the components and these portions are combined to provide the final product with the desired variation in graft ratios. Instead of withdrawing portions of the reaction product at a plurality of points along the flow path, the rubber polymer, or both the rubbery polymer and polymerizable formulation, may be introduced at a plurality of points along the flow path. In each case, the period for grafting upon the rubbery polymer will be varied with respect to increments thereof with resultant variation in the graft ratios.

In another aspect, portions of the product stream may be recycled and introduced at a plurality of points along the flow path to vary the graft ratios in the product stream since these recycled portions will be subjected to increased and varied flow paths. This effect may be created or enhanced by varying the rate of recycling of a portion of the product stream to produce variations in the polymerization conditions.

In still another embodiment of the process, all or an initial portion of the polymerizable formulation and all or a part of the rubbery formulation are reacted to produce graft polymerization without withdrawing any product stream and thereafter the remaining reactants are added substantially continuously and the product stream is withdrawn. However, the reactor should provide variations in the flow path to increase the spectrum of graft ratios.

In addition, other factors which would vary the graft polymerization conditions may be superimposed such as varying the temperature profile along the flow path, varying the catalyst and/or the concentration thereof, varying agitation rates, etc. Various of these techniques may be combined, if so desired, to obtain the desired result in distribution of graft ratios.

The instant process is suitable for use whenever it is desirable to produce a graft having a range of graft ratios. The polymerizable formulation will contain one or more monovinylidene compounds with the combination of monomers being dependent upon the comonomers and the rubbery polymer since some monovinylidene monomers are graftable only with difficulty upon the rubbery polymer and combinations of the monomers may produce a more readily graftable interpolymer.

As previously indicated, the process may involve a prepolymerization reaction wherein all or a portion of the reactants are included, after which the partially polymerized mixture is conducted in the flow path of the continuous process herein. This prepolymerization reaction may be conducted en masse or with the reactants dispersed in an inert non-solvent. By use of such a prepolymerization reaction, both partial grafting of all the rubbery polymer may be ensured and a more highly grafted portion can be obtained to increase the spectrum without utilizing a long flow path or cycle. When the prepolymerization is conducted en masse, greater control of the particle size in a continuous suspension process may be obtained. However, the partially prepolymerized mixture of reactants also may be emulsified.

Although the process will normally produce not only the grafted rubbery polymer but also a resinous polymer forming a matrix thereof, the process conditions and ratio of reactants may be varied so as to minimize the formation of resinous polymer and to produce a product stream of substantially graft copolymer. This graft copolymer product stream may then be utilized in this form or it may be blended with the resinous polymers which will form a matrix thereof (as well as any resinous polymer produced in addition if such resinous polymer is not the same).

Depending upon the process conditions employed, the product stream may contain unpolymerized monomer formulation, and it will be generally necessary to extract the residual monomers to obtain optimum product properties. This may be effected batchwise or continuously in a suitable vessel in accordance with conventional techniques for stripping such monomers.

Referring now to the appended drawing, FIGURES 1–5 are schematic depictions of processes illustrative of a number of the possible variations which can be employed to achieve the control necessary to obtain graft polymers having a spectrum of graft ratios.

FIGURE 1 shows a simple reaction vessel A, provided with an agitator 12. The reactants and inert non-solvent are continuously introduced through the conduit marked 1, and the product is continuously removed through the conduit marked 2 which is at a point spaced from the conduit 1 so as to provide a flow path. It should be understood that introduction may beneficially be made through a number of conduits, and the feed of one reactant may be varied or the point of introduction of the feed may be varied to alter the flow path, all of which provide an increased degree of control. In addition, baffles may be included within the reaction vessel A to ensure a minimum flow path and to enhance deviation in the flow path or residence time of the reactants. Furthermore, the conduit 2 may simply be an overflow device so that the volume of product removed is directly related to the rate of feed.

By controlling the agitation of the dispersion in the vessel A, it is possible to vary the flow path for portions of the reactants and to obtain at conduit 2 a product stream with graft polymer having a spectrum of graft ratios. The product will contain not only fresh, relatively lightly-grafted rubber, but also rubber having a relatively high level of grafting due to relatively long residence time in the vessel. Rubbers having graft ratios intermediate of the extreme values are also obtained, thus producing a product having a spectrum of graft ratios.

Figure 2:
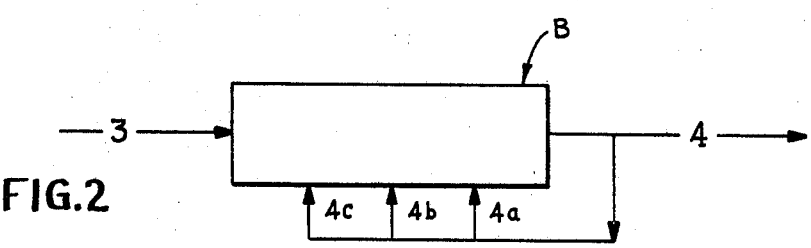

FIGURES 2–5 all show elongated reaction vessels B, C, D, E, and F providing elongated flow paths wherein control is achieved by various modifications. In FIGURE 2, the dispersion of reactants is fed into vessel B through conduit 3 and the product stream removed through conduit 4. Control of polymerization conditions is achieved by recycling part of the product stream in conduit 4 through conduits 4a, 4b and 4c which connect to inlet ports along the length of the vessel B. Since the recycle streams are reintroduced into vessel B at different locations along the flow path, variations in the residence or reaction times are effected for the various portions of the recycled product stream, the material reintroduced through conduit 4b and that introduced through 4c having a longer residence than the portion reintroduced through 4a. Flexibility and control in such a system is easily attained by varying the overall recycle ratio as well as by varying the proportion of product stream returned through each conduit.

Figure 3:
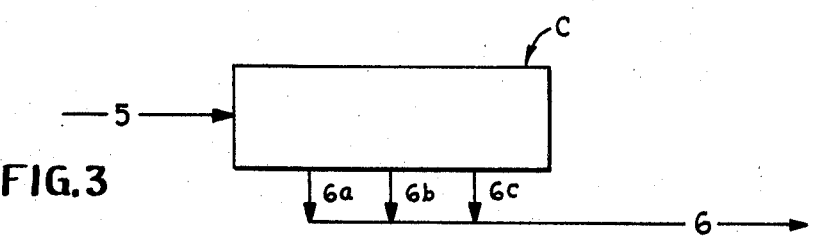

Turning now to FIGURE 3, it will be seen that vessel C is an elongated reaction vessel provided with a number of outlet ports located at various positions along the length of the vessel. Fresh feed is introduced through conduit 5 and, after the reactants have passed through a short reaction zone, relatively lightly grafted material is removed through conduit 6a. Simultaneously, rubbers having progressively higher levels of grafting are removed by conduits 6b and 6c which connect to outlets located further downstream, and the several conduits merge into the main conduit 6 to provide a product stream having a spectrum of graft ratios through conduit 6. Flexibility in this instance is possible by regulating the relative quantities of product withdrawn through the various outlet conduits.

Figure 4:
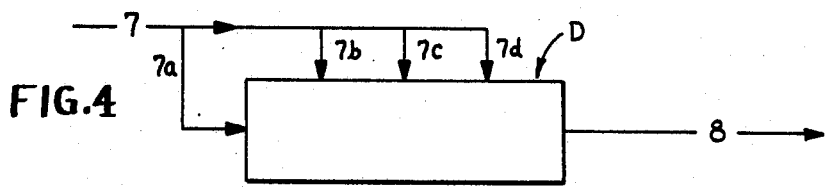

FIGURE 4 illustrates a modification wherein the stream of reactants in the conduit 7 is introduced into the elongated reaction vessel D at a number of locations along the length of the vessel or flow path, and the product is withdrawn through the conduit 8. By introducing portions of the reaction mixture at points further along the reaction vessel than other portions, it is obvious that the earlier introduced portions have longer residence times in the vessel than those portions introduced later on, and hence will achieve higher levels of grafting. By varying the proportions of the feed introduced at the locations disposed along the length of the reaction vessel, through inlet ports connected to the conduits 7a, 7b, 7c, and 7d, a desirable degree of flexibility and control is obtained.

Figure 5:
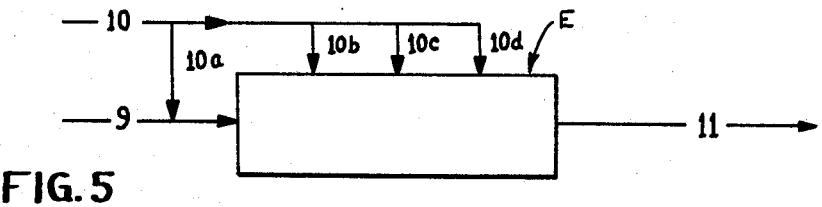

In a manner similar to that depicted in FIGURE 4, in the apparatus shown in FIGURE 5 a dispersion of the rubbery polymer in the conduit 10 is introduced to reaction vessel E through a plurality of conduits 10a, 10b, 10c and 10d which communicate with inlet ports positioned at various locations along the length of the elongated vessel. In this embodiment, the dispersion of the polymerizable formulation is introduced through the feed conduit 9. Thus, the control of polymerization conditions is easily effected by adjusting the flow rate and the amount of the rubbery polymer introduced through the several conduits.

It will be appreciated that this embbdiment may be altered or combined with other controlling conditions to obtain the desired effect. For example, some of the polymerizable formulation may be admixed with the rubbery polymer introduced through the several conduits 10. Varying amounts of catalyst could be introduced at the various locations through the several conduits 10, or if they are connected to independent sources, catalysts of different activity may be so introduced. By combining the various possibilities which will be apparent to those skilled in the art, an infinite number of variations is possible using this type embodiment.

It will be appreciated that the foregoing schematic diagrams are merely illustrative and should in no way be construed as limiting the invention to the use of the process embodiments shown and described. Moreover, it will also be appreciated that numerous modifications to the limited number of possibilities depicted are also possible. Thus, the modifications may be used in any suitable combination to achieve a maximum degree of flexibility and control. Any suitable number of inlet and/or outlet ports can be provided along the length of the elongated vessels. The components need not be introduced as a single stream; they may be introduced independently or in any practical combination, and they may be introduced at different locations along the length of the reaction vessel or at any practical number of locations. The rubber may be introduced wholly free of graft, or as was previously mentioned, in a partially grafted state, desirably from a continuous mass polymerization reaction. In any case, however, it is usually most beneficial to allow the system to attain equilibrium before any product is retained.

Admixture of the reactants with the inert non-solvent may be effected in the reaction vessel or in a separate vessel depending upon the requirements of the process, and the actual reaction vessel may assume a variety of configurations as will be apparent to those skilled in the art of reactor design. For example, the reactor may be of simple tubular design or it may be of baffled construction. Generally, some means for agitation of the dispersion should be provided as should be heat exchange means.

The enumeration of materials which can be introduced at the various locations along the length of the reaction vessels should not be considered to limit the invention thereto, as it may be beneficial to add any material at the spaced locations which will affect the graft reaction. Moreover, the invention is not limited to the type of reaction vessel depicted in FIGURE 1, or the elongated vessels depicted in FIGURES 2–5, but any vessel which will provide a flow path in which a continuous reaction may be effected and in which control of the degree of grafting would be possible is suitable.

THE RUBBER SUBSTRATE

The various rubbers upon which the polymerizable monomer formulation may be grafted during polymerization in the presence thereof include diene rubbers, natural rubbers, ethylene-propylene terpolymer rubbers, acrylate rubbers, polyisoprene rubbers and mixtues thereof, as well as interpolymers thereof with each other or with other copolymerizable monomers.

The effectiveness of a particular rubber as a substrate will vary with the nature of the polymerizable monomer formulation. Ethylene-propylene terpolymers providing pendant unsaturation have been used for grafting with vinyl halides and vinyl esters and so may be used desirably where such monomers are to be included within the interpolymers. Various other rubbers with varying effectiveness of grafting efficiency may be used with the several combinations of monomers through variation in the temperature and the amount of catalyst provided. The rubbers most advantageously employed for suspension polymerization are those produced by solution polymerization with anionic or Ziegler-type catalysts.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D–746–52T) of one or more conjugated, 1,3-dienes, e.g., butadiene, isoprene, piperylene, chloroprene, etc. Such rubbers include homopolymers of conjugated 1,3-dienes or interpolymers thereof with up to an equal amount by weight of one or more copolymerizable monoethylenically unsaturated monomers, such as monovinylidene aromatic hydrocarbons (e.g., styrene; an aralkyl-styrene, such as the o-, m- and p-methylstyrenes, 2,4-dimethyl-styrene, the ar-ethylstyrenes, tert-butylstyrene, etc.; an alpha-alkylstyrene, such as alpha-methylstyrene, alpha-ethyl-styrene, alpha-methyl-p-methylstyrene, etc.; vinyl naphthalene, etc.); arhalo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.); the corresponding alkyl methacrylates; acrylamides (e.g., acrylamide, methacrylamide, N-butyl-acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and vinylidene chlorides and bromides, etc.); and the like.

Although the rubber may contain up to about 2.0 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics.

However, cross-linking of the rubber graft is desirable to preserve proper morphology of the particles thus produced. Accordingly, some cross-linking during the grafting reaction is advantageous and inherent cross-linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous substrates are butadiene homopolymer or an interpolymer of 90.0 to 95.0 percent by weight butadiene and 5.0 to 10.0 percent by weight of acrylonitrile or styrene.

It is also possible, and often desirable, to introduce the rubber in a partially grafted state to the reaction vessel. Thus, the rubber will have been partially grafted in a polymerization reaction conducted en masse prior to its being reacted in accordance with the present method. Normally, in such a case, the polymerizable formulation will have been polymerized en masse to approximately the 20 to 50 percent conversion; that is 20 to 50 percent of the original monomer formulation will have been polymerized. Thereafter, the partially polymerized syrup is dispersed in water, generally of suspension, with the addition of suspending agent to minimize any tendency for emulsion formation. Generally such syrups will have a viscosity of 40 to 20,000 poises at 25° centigrade at a shear rate of 1.0 second$^{-1}$.

POLYMERIZABLE MONOMER FORMULATIONS

The polymerizable monomer formulation will, of course, contain the monomers to be polymerized, catalyst where required, and other desirable components such as stabilizers, molecular weight regulators, etc.

The specific monomers will, of course, vary with the desired product. However, the process is highly advantageously employed in the manufacture of styrene-type polyblends, i.e., polymerizable monomer formulations containing monovinylidene aromatic hydrocarbons either alone or in combination with other copolymerizable monomers such as unsaturated nitriles. Where a styrene-type monomer is employed solely, then the resultant product will be of the type known as an "impact styrene." Where styrene and acrylonitrile-type monomers are employed jointly in the polymerizable formulation, the resulting product will be of the type known as "ABS." However, it should be understood that the composition of the polymerizable formulation may vary widely.

Exemplary of the monovinylidene aromatic monomers that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrene, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of other vinylidene monomers that can be employed or interpolymerized with monovinylidene aromatic monomers are unsaturated nitriles, such as acrylonitrile, methacrylonitrile, and mixtures thereof; conjugated 1,3 - dienes, e.g., butadiene, isoprene, etc.; alpha- or beta - unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromoide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in an interpolymer will vary.

The preferred polymerizable monomer formulations contain at least 10.0 percent by weight of monovinylidene aromatic monomer and preferably at least 50.0 percent by weight thereof. Desirably they contain an unsaturated nitrile which should be present in the amount of at least 5.0 percent by weight thereof, and preferably at least 10.0 percent. From the standpoint of highly advantageous ABS-type products, the monomer formulations contain 20.0 to 95.0 percent, and preferably they should contain 60.0 to 85.0 percent, by weight of the monovinylidene aromatic hydrocarbon such as styrene, and 80.0 to 5.0 percent, and preferably 40.0 to 15.0 percent, by weight of the unsaturated nitrile such as acrylonitrile.

POLYMERIZATION PROCESSES

As previously indicated, the graft polymerization process is conducted with the reactants dispersed in an inert non-solvent which may be an emulsion or suspension depending upon the desired particle size and the process or equipment characteristics. Although various inert non-solvents may be employed such as the alkylene and polyalkylene glycols, water is generally most advantageous because of cost factors. The term "inert non-solvent" as employed herein means liquids which do not exhibit any substantial tendency to react with the monomers of the polymerizable vinylidene monomer formulation or with the rubber substrate or to polymerize and in which the rubber, polymerizable vinylidene monomer formulation and resultant polymer have little or no solubility.

Any free radical generating catalyst may be employed including actinic radiation and heat. However, time considerations will generally favor the inclusion of a conventional peroxy catalyst, usually in the range of 0.001 to 3.0 percent by weight of the monomers, and preferably on the order of 0.005 to 1.5 percent by weight. The actual catalyst selected and the amount will depend upon the monomers, the nature of the dispersion and the desired graft polymerization cycle. Redox systems may also be employed. As previously indicated, the amount added and rate of catalyst addition, and even the nature of the catalyst, may vary along the flow path.

As is well known, it is often desirable to incorporate molecular weight regulators such as mercaptans, halides and terpenes in relatively small percentages by weight, on the order of 0.001 to 5.0 percent by weight of the polymerizable material. In addition, it may be desirable to include relatively small amounts of antioxidants or stabilizers such as the conventional alklated phenols, although these may be added during or after polymerization. In addition, the formulation may also contain other additives such as plasticizers, lubricants, colorants and non-reactive preformed polymeric materials which are suitable or dispersible therein.

The ratio of monomer formulation to rubbery polymer will vary with the desired spectrum of grafting ratios, the amount of resinous matrix to be produced, the process conditions, the nature and amount of the catalyst, and the particular process selected. Normally, the ratio of monomers will be in the range of 20–500:100, and preferably on the order of 50–250:100.

The graft ratios of the increments of the product will generally fall within the range of 1:10 to 4:1 and preferably about 1:5 to 2.5:1. Although the spectrum of graft ratios may vary over a narrow range or a wide range, generally the most highly grafted increment should have a graft ratio at least two times, and preferably at least three times, the graft ratio of the least grafted increment, with increments of intermediate graft ratios also being included so as to provide a complete spectrum.

Moreover, it will be readily apparent that the continuous process of the present invention may be a truly continuous process conducted over indefinite periods of time or a continuous batch process wherein a product stream is withdrawn from a reactor for an extended period of time as the process is being conducted.

EMULSION POLYMERIZATION PROCESS

In the emulsion polymerization proces, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other alkali metal soaps. Generally, the emulsifying agent is provided in amounts of about 1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomer formulation is incorporated with or without additional emulsifying agents, etc. However, the rubber may be dissolved in the monomer formulation and the mixture emulsified, or a latex thereof may be separately prepared.

Although any means of generating free radicals may be employed including actinic radiation and heat, various water-soluble free radical polymerization initiators are conventionally used for emulsion polymerization of the rubber monomer including conventional peroxy and azo catalysts, the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates, and percarbonates, and hydrogen peroxide.

The emulsion mixture is then polymerized in accordance with the present invention in an inert atmosphere at temperatures in the range of 20 to 100° centigrade, and pressures of 1 to 100 pounds per square inch may be employed. Polymerization desirably continued until substantially all, i.e., more than 90 percent, of the monomers have reacted. The remaining monomers and other volatile components are distilled from the product stream latex, which is then dewatered, washed and dried.

Particle size of the emulsion graft particles may be varied by seeding, emulsifying agent concentration, agitation, rubber-size, coagulation techniques, etc. Agglomeration of particles may also be employed.

SUSPENSION POLYMERIZATION PROCESS

In a suspension process, the monomers and rubber substrate are suspended in an aqueous medium, generally with the aid of a suitable suspending agent and possibly also a secondary suspending aid. It is necessary in such a process to provide sufficient agitation or turbulence in the reaction vessel to maintain the reactants in suspension within the inert non-solvent.

Various suspending agents may be employed to achieve the desired suspension, such as the acrylic acid-acrylate interpolymers of United States Patent No. 2,945,013, granted July 12, 1960, and United States Patent No. 3,051,682, granted August 28, 1962. Exemplary of a secondary dispersing aid which may be included if desired are the condensation products of naphthalene sulfonic acids and aldehydes and the salts thereof, such as those sold by R. T. Vanderbilt Company under the trademark Darvan. The suspending agent is desirably added to the water, although it may be added to the monomer formulation. As will be appreciated, other dispersion aids may be incorporated such as sequestering agents, water-conditioning agents, emulsion depressants and stabilizers.

Alothough the polymerization reaction may proceed thermally without added catalysts or by use of actinic radiation, it is preferable to incorporate a suitable catalyst system for polymerizing the monomer such as the conventional monomer-soluble peroxy compounds or perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl - 2,5-di(tert-butylperoxy)hexane, 2,5-dimethyl-2,5-di(tert - butylperoxy)hexyne - 3, tert-butyl hydroperoxide, cumene hydroperoxide, p-menthane hydroperoxide, cyclopentane hydroperoxide, diisopropylbenzene hydroperoxide, p-tert-butylcumene hydroperoxide, pinene hydroperoxide, 2,5-dimethylhexane-2,5-di-hydroperoxide, etc., and mixtures thereof. The reaction conditoins will vary with the monomers and the range in grafting ratios desired.

Exemplary of the efficacy of the present invention are the following specific examples wherein all parts are parts by weight unless otherwise indicated.

Example 1

A continuous batch-type reaction was conducted in apparatus wherein a reaction vessel and a collection vessel were set up in series so that the overflow from the reaction vessel ran into the collection vessel. Both vessels were provided with heaters, agitators and reflux condensers. The reaction vessel was also fitted with valved conduits for the introduction of materials to the system.

An initial charge was placed in the reaction vessel comprising 498 parts of water, 230 parts of a 2 percent by weight aqueous solution of potassium persulfate catalyst, 2.3 parts sodium stearate and 580 parts of latex containing 39.8 percent by weight of a rubbery butadiene-acrylonitrile copolymer. This mixture was heated to about 65° centigrade and then an initial monomer charge comprising 460 parts of a 70:30 mixture of styrene and acrylonitrile monomers and 0.8 part of a chain-transfer agent was incrementally added over a period of about two hours. At this point overflow from the reaction vessel commenced.

Thereafter, both the monomer formulation and rubber polymer were continuously added through the valved conduits provided at respective rates of about 22 and 55 cc. per ten minutes per liter of reactor volume, the composition of each stream being substantially proportioned to that of the comparable initial charge. The temperature in the reaction vessel was held at about 65° centigrade.

When the collection vessel was filled to capacity, it was emptied and the contents set aside. In this example, five batches of product were collected. The first quantity collected was designated A and discarded as being non-representative since it was considered to be produced prior to the establishment of equilibrium conditions in the system. The remaining four samples were labeled B, C, D, and E in order of collection. Samples D and E consisted of the product remaining in the collection vessel and the reaction vessel respectively at the time that the final quantities of reactants had been introduced. Both of these products were held at reaction temperature for about three-quarters of an hour past the point of final introduction of reactants to conversion of more than 98 percent of the monomers.

The latices comprising Samples B through E contained the following percentages of solids: 34.4, 35.1, 37.5, and 38.4, respectively. To each sample of crumb recovered from the coagulated latex was added a quantity of styrene-acrylonitrile copolymer sufficient to adjust the content of the rubbery polymer therein to about 24 percent. A lubricant and a stabilizer were added to the blends, portions of which were then extruded at 450° Fahrenheit and molded at about 425° Fahrenheit with all samples exhibiting good melt flow and processability. A series of physical tests was performed using the resulting samples, the data from which are presented below. These samples were labeled to correspond to the intermediate products from which they were produced.

| Test | Sample | | | |
|---|---|---|---|---|
| | B | C | D | E |
| Izod Impact (ft.-lbs./in. notch) | 3.65 | 3.43 | 3.15 | 2.50 |
| Tensile Strength (p.s.i.) at— | | | | |
| Yield | 6,500 | 6,300 | 6,000 | 6,200 |
| Failure | 5,200 | 4,900 | 4,600 | 4,800 |
| Percent Elongation at— | | | | |
| Yield | 3.15 | 3.22 | 3.25 | 3.20 |
| Failure | 10.1 | 10.7 | 14.1 | 10.3 |
| Percent Shrinkage* | 25.3 | 28.0 | 25.3 | 26.9 |

*Specimen 4.74 inches long and about 0.13 inch thick is heated at 150° C. for 1½ hours and shrinkage is determined.

As can be seen, the batches B–D all exhibit highly desirable properties and contain graft copolymers with a wide spectrum of graft ratios due to the wide variation in flow path for various portions affected by the process conditions. In addition, the moldings exhibited good gloss and surface properties.

Example 2

The procedure of Example 1 was repeated with slight modification. The amounts of catalyst and chain-transfer agent employed were modified to 14 and 15 parts per thousand based upon the weight of monomers employed. The reaction temperature was elevated 5° centigrade. In addition, lower rates of introduction of monomer and rubber premixes (respectively about 12.5 and 32.5 cc. per ten minutes per liter of reactor volume) were employed to give longer residence times in the reaction vessel.

The samples collected were treated in a manner comparable to those collected in Example 1. Here, however, in addition to the initial volume of product collected, the fractiton of product comparable to Sample E in the above example was also discarded. The remaining fractions, corresponding to Samples B, C and D in the preceding example were so marked. The latices contained 36.9, 38.3 and 39.2 percent of solids respectively. After blending of the coagulated crumb with styreneacrylonitrile copolymer to produce about 24 percent rubber-concentration, portions were extruded, molded and tested as in Example 1. The moldability in all instances was satisfactory. The following data were obtained.

| Test | Sample | | |
|---|---|---|---|
| | B | C | D |
| Izod Impact (ft.-lbs./in. notch) | 4.2 | 5.0 | 3.8 |
| Hunter Gloss | 69.4 | 74.2 | 60.7 |
| Percent Shrinkage | 24.7 | 22.0 | 19.9 |

As can be seen by this process, it is possible to prepare resinous compositions having desirable impact strength combined with high quality surface characteristics in an economical and convenient manner.

Thus, it can be seen from the foregoing detailed specification and examples that the process of the present invention affords a relatively simple and economical continuous method for obtaining a graft copolymer with a relatively wide spectrum of graft ratios. The process is adapted to considerable variation and permits combinations of various process-affecting elements.

It is relatively simple to vary the spectrum of grafting at the same rubber level or to vary the spectrum of rubber level within the same spectrum of grafting to obtain a desired balance of properties or emphasis of certain properties, such as an increase in gloss, or an increase in impact strength. The process conditions selected accordingly depend upon the desired properties. Resinous products containing the graft copolymer will generally provide a highly desirable balance of properties or emphasis of properties within tolerable limits of balance and the process may be adjusted to provide substantially a graft copolymer of desirable properties which may be used per se as a modified rubber or as a rubber component for blending with resinous polymers to provide a rubber-modified composition.

What is claimed is:

1. In a polymerization process wherein the reactants are dispersed in an inert non-solvent therefor, the steps comprising continuously admixing a graftable rubbery polymer and a polymerizable vinylidene monomer formulation graftable upon said rubbery polymer in an inert non-solvent therefor to form a dispersion thereof, subjecting said dispersion to polymerization conditions along a flow path while controlling the exposure of portions of the rubbery polymer to polymerization conditions to produce varying degrees of grafting of said polymerizable formulation upon increments of said rubbery polymer, and substantially continuously withdrawing from said flow path a product stream containing graft copolymer dispersed in said non-solvent, increments of said graft copolymer in said product stream having varying graft ratios within the range of about 1:10 to 3:1.

2. The process in accordance with claim 1 wherein said flow path is elongated and wherein controlling of polymerization conditions is effected by withdrawing portions of said dispersion at a plurality of points along said flow path and said portions are combined to form said product stream.

3. The process in accordance with claim 1 wherein said reaction path is elongated and wherein said controlling of polymerization conditions is effected by introducing portions of the reactants at a plurality of points along said reaction path.

4. The process in accordance with claim 3 wherein said portions of said reactants comprise rubbery polymer.

5. The process in accordance with claim 3 wherein said portions of said reactants comprise a polymerizable formulation.

6. The process of claim 1 wherein said flow path is elongated and wherein said controlling of polymerization conditions is effected by recycling portions of said product stream to a plurality of points along said reaction path.

7. The process of claim 1 wherein at least a portion of said rubbery polymer and polymerizable formulation are partially polymerized en masse prior to admixture with said non-solvent to form said dispersion.

8. The process of claim 1 wherein said controlling of polymerization conditions is effected by at least partially polymerizing a dispersion of a portion of said rubbery polymer and polymerizable formulation initially and thereafter by continuously introducing reactants and withdrawing a product stream under conditions providing reaction times of varying duration for portions of said reactants.

9. The process of claim 1 wherein said controlling of polymerization conditions is effected by recycling a portion of said product stream to said reaction path and varying the amount of such portion recycled to produce variations in the polymeriaztion conditions of increments of the dispersion.

10. The process of claim 1 wherein said polymerizable formulation contains at least 10 percent by weight of a monovinylidene aromatic hydrocarbon.

11. The process of claim 10 wherein said monovinylidene aromatic hydrocarbon is styrene.

12. The process in accordance with claim 1 wherein said rubbery polymer contains at least 75 percent by weight of a conjugated diene and said polymerizable formulation consists at least principally of a monovinylidene aromatic hydrocarbon and an ethylenically unsaturated nitrile.

13. The process in accordance with claim 1 wherein said polymerizable formulation contains 60 to 85 percent by weight of styrene and 40 to 15 percent by weight of acrylonitrile and wherein said rubbery polymer contains at least 75 percent by weight of a conjugated diene and is present in an amount of about 5 to 100 percent by weight of said polymerizable formulation.

14. The process in accordance with claim 1 wherein polymeric solids are recovered from said product stream and wherein said polymeric solids comprise a matrix of resinous polymer in which particles of said graft copolymer are dispersed, said graft copolymer having a superstrate corresponding substantially to the resinous polymer.

15. The process in accordance with claim 1 wherein polymeric solids are recovered from said product stream and blended with a resinous polymer to provide a dispersion of said graft copolymer in said resinous polymer.

16. A composition comprising a resinous matrix having dispersed therein a graft copolymer having a relatively wide spectrum of graft ratios in the range of about 1:10 to 3:1, the most highly grafted increment having a graft ratio of at least twice that of the least grafted increment, said graft copolymer including increments of intermediate graft ratios and having a polymeric superstrate and a graftable rubbery polymer substrate containing at least 75% by weight of a conjugated diene, said polymeric superstrate and said resinous matrix containing from 10–100% of a monovinylidene aromatic hydrocarbon and from 0–90% of an ethylenically unsaturated nitrile and being comprised at least principally of monomers selected from the group consisting of monovinylidene aromatic hydrocarbons, ethylenically unsaturated nitriles and mixtures thereof, said graft copolymer having been produced by a continuous process wherein the graftable rubbery polymer and the polymerizable vinylidene monomer formulation graftable upon said rubbery polymer are continuously admixed in an inert non-solvent therefor to form a dispersion thereof, said dispersion is subjected to polymerization conditions while controlling the exposure of the rubbery polymer to polymerization conditions to produce varying degrees of grafting of said polymerizable formulation upon increments of said rubbery polymer and a product stream is substantially continuously withdrawn which contains said graft copolymer dispersed in said non-solvent.

17. The composition of claim 16 wherein said polymeric superstrate and resinous matrix consists at least principally of a monovinylidene aromatic hydrocarbon and an ethylenically unsaturated nitrile.

18. The composition of claim 16 wherein said matrix and superstrate are interpolymers of styrene and acrylonitrile.

References Cited

UNITED STATES PATENTS

| | | | |
|---|---|---|---|
| 2,957,833 | 10/1960 | Baum | 260—880 XR |
| 3,073,798 | 1/1963 | Baer | 260—876 |
| 3,170,964 | 2/1965 | Grabowski I | 260—876 |
| 3,267,175 | 9/1966 | Grabowski II | 260—876 XR |

FOREIGN PATENTS

| | | |
|---|---|---|
| 1,009,655 | 11/1965 | Great Britain. |
| 1,013,393 | 12/1965 | Great Britain. |

MURRAY TILLMAN, Primary Examiner

K. E. KUFFNER, Assistant Examiner

U.S. Cl. X.R.

260—878, 880